(12) United States Patent
Joye

(10) Patent No.: US 8,548,162 B2
(45) Date of Patent: Oct. 1, 2013

(54) METHOD AND A DEVICE FOR PERFORMING TORUS-BASED CRYPTOGRAPHY

(75) Inventor: Marc Joye, Cesson-Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/377,663

(22) PCT Filed: Jun. 10, 2010

(86) PCT No.: PCT/EP2010/058131
§ 371 (c)(1),
(2), (4) Date: Dec. 12, 2011

(87) PCT Pub. No.: WO2010/145983
PCT Pub. Date: Dec. 23, 2010

(65) Prior Publication Data
US 2012/0087491 A1    Apr. 12, 2012

(30) Foreign Application Priority Data
Jun. 16, 2009    (EP) .................................... 09305553

(51) Int. Cl.
*H04L 9/00*    (2006.01)
(52) U.S. Cl.
USPC ......................................................... 380/28
(58) Field of Classification Search
USPC ......................................................... 380/28
See application file for complete search history.

(56) References Cited

U.S. PATENT DOCUMENTS

| | | | |
|---|---|---|---|
| 2010/0046741 A1* | 2/2010 | Isogai et al. | 380/28 |
| 2010/0046745 A1* | 2/2010 | Hanatani et al. | 380/30 |
| 2010/0046746 A1* | 2/2010 | Yonemura et al. | 380/30 |
| 2010/0049777 A1* | 2/2010 | Yonemura et al. | 708/204 |

OTHER PUBLICATIONS

K. Rubin et al: "Torus-Based Cryptography", 23rd Annual Int'l Cryptography Conf. Aug. 17-21, 2003, vol, 2729, pp. 349-365.
I. Dechen: Generalized Jacobians in Cryptography Sep. 1, 2005, pp. 1-203 Part 1 and Part 2.
P. Smith et al: "LUC: a new public key system" IFIP Transactions A. vol. A-37, Jan. 1, 1993, pp. 103-117.
G. Ateniese et al: "A practical and provably secure coalition-resistant group signature scheme" Advanced in Cryptology, vol. 1880, pp. 255-270.
Search report dated Aug. 2, 2010.

* cited by examiner

*Primary Examiner* — Jacob Lipman
(74) *Attorney, Agent, or Firm* — Myers Wolin, LLC

(57) ABSTRACT

At CRYPTO 2003, Rubin and Silverberg introduced the concept of torus-based cryptography over a finite field. The present invention extends their setting to the ring of integers modulo N, thus obtaining compact representations for cryptographic systems that base their security on the discrete logarithm problem and the factoring problem. This can result in small key sizes and substantial savings in memory and bandwidth. However, unlike the case of finite field, analogous trace-based compression methods cannot be adapted to accommodate the extended setting of the invention when the underlying systems require more than a mere exponentiation. The invention finds particular application in a torus-based implementation of the ACJT group signature scheme. Also provided is a processor.

2 Claims, 1 Drawing Sheet

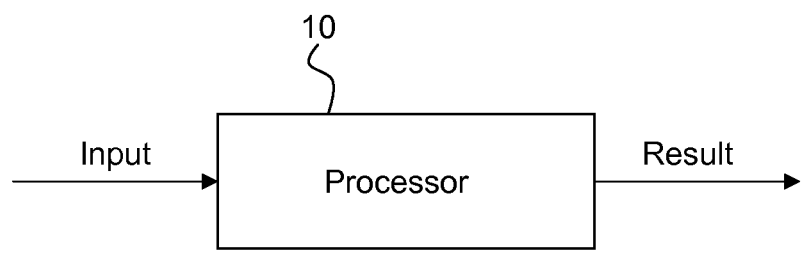

METHOD AND A DEVICE FOR PERFORMING TORUS-BASED CRYPTOGRAPHY

This application claims the benefit, under 35 U.S.C. §365 of International Application PCT/EP2010/058131, filed Jun. 10, 2010, which was published in accordance with PCT Article 21(2) on Dec. 23, 2010 in English and which claims the benefit of European patent application No. 09305553.1, filed on Jun. 16, 2009.

TECHNICAL FIELD

The present invention relates generally to cryptography, and more particularly to torus-based cryptography.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Groups where the discrete logarithm problem is assumed to be intractable are central in the design of public-key cryptography. This was first pointed out by Diffie and Hellman in their seminal report: Whitfield Diffie and Martin E. Hellman, "New Directions in Cryptography", *IEEE, Transactions on Information Theory*, 22(6):644-654, 1976.

The security of the Diffie-Hellman key-distribution system relies on the intractability of the discrete logarithm problem in the multiplicative group of finite fields. Such groups also enable the construction of encryption schemes, digital signature schemes, and many other cryptographic primitives and protocols; see Alfred J. Menezes, Paul C. van Oorchot, and Scott A. Vanstone, *"Handbook of Applied Cryptography"*, CRC Press, 1997.

Several solutions have been proposed to improve the efficiency of the so-obtained schemes.

Schnorr suggests working in a prime-order subgroup of $\mathbb{F}_p^x$ rather than in the whole group $\mathbb{F}_p^x$; see Claus-Peter Schnorr, "Efficient Signature Generation by Smart Cards". *Journal of Cryptology*, 4(3):161-174, 1991.

Lenstra extends this idea to the cyclotomic subgroup of $\mathbb{F}_p^x r$, stating that the underlying field is really $\mathbb{F}_p r$ and not some intermediate subfield; see Arjen K. Lenstra, "Using Cyclotomic Polynomials to Construct Efficient Discrete Logarithm Cryptosystems Over Finite Fields", in V. V. Varadharajan, J. Pieprzyk, and Y. Mu, editors, *Information Security and Privacy (ACISP '97)*, volume 1270 of *Lecture Notes in Computer Science*, pages 127-138. Springer-Verlag, 1997.

More recently, Rubin and Silverberg rephrased cyclotomic subgroups in terms of algebraic tori over $\mathbb{F}_p$. The main advantage of their approach resides in the compact representation of the elements. See Karl Rubin and Alice Silverberg, Torus-Based Cryptography, In D. Boneh, editor, *Advances in Cryptology—CRYPTO* 2003, volume 2729 of *Lecture Notes in Computer Science*, pages 349-365. Springer-Verlag, 2003.

Other prominent proposals featuring a compact representation include LUC (see Peter Smith and Christopher Skinner, "A public-key cryptosystem and a digital signature system based on the Lucas function analogue to discrete logarithms", In J. Pieprzyk and R. Safavi-Naini, editors, *Advances in Cryptology—ASIACRYPT'94*, volume 917 of *Lecture Notes in Computer Science*, pages 357-364. Springer-Verlag, 1995.) and XTR (see Arjen K. Lenstra and Eric R. Verheul, "The XTR public key system". In M. Bellare, editor, *Advances in Cryptology—CRYPTO* 2000, volume 1880 of *Lecture Notes in Computer Science*, page 119. Springer-Verlag, 2000).

Variants of Diffie-Hellman key-distribution system in the multiplicative group $\mathbb{Z}_N^x$, where N is the product of two primes are proposed by Kevin S. McCurley (see "A key distribution system equivalent to factoring", *Journal of Cryptology*, 1(2):95-105, 1988) and Zahava Shmuely (see "Composite Diffie-Hellman public key generating systems hard to break", Technical Report 356, Israel Institute of Technology, Computer Science Department, Technion, February 1985). The goal is to combine the security of the original scheme with the difficulty of factoring large numbers. McCurley argues that it may be desirable to design cryptographic systems with the property that breaking them requires solving two different computational problems.

SUMMARY OF INVENTION

In a first aspect, the invention is directed to a cryptographic method for obtaining an intermediate result for use in enciphering, authenticating or signing data. The method operates on a torus over $\mathbb{Z}_N$, where N is a product of at least two prime factors and the torus has parameter D in $\mathbb{Z}_N$. A processor performs at least one multiplication of two elements $m_1$ and $m_2$ over the torus, and outputs the result of the multiplication. The result of the torus multiplication is equal to a division over $\mathbb{Z}_N$, where the dividend is the sum of D with the product of $m_1$ and $m_2$ and the divisor is the sum of $m_1$ and $m_2$. At least one of $m_1$ or $m_2$ is one of: a) the data to be enciphered, authenticated or signed, b) a cryptographic key, or c) an intermediate result depending of at least one of a) or b).

In a second aspect, the invention is directed to a processor for performing a cryptographic method for obtaining an intermediate result for use in enciphering, authenticating or signing data. The cryptographic method operates on a torus over $\mathbb{Z}_N$, where N is a product of at least two prime factors and the torus has parameter D in $\mathbb{Z}_N$. The processor is adapted to perform at least one multiplication of two elements $m_1$ and $m_2$ over the torus, and output the result of the torus multiplication. The result of the torus multiplication being equal to a division over $\mathbb{Z}_N$, where the dividend is the sum of D with the product of $m_1$ and $m_2$, and the divisor is the sum of $m_1$ and $m_2$. At least one of $m_1$ or $m_2$ is one of: a) the data to be enciphered, authenticated or signed, b) a cryptographic key, or c) an intermediate result depending of at least one of a) or b).

BRIEF DESCRIPTION OF DRAWINGS

Preferred features of the present invention will now be described, by way of non-limiting example, with reference to the accompanying drawings, in which FIG. 1 illustrates a device for performing cryptography calculations according to a preferred embodiment of the present invention.

DESCRIPTION OF EMBODIMENTS

The present application introduces torus-based cryptography over the ring $\mathbb{Z}_N$. It can find applications in settings similar to those considered by McCurley. An advantage is that it can increase the performance of cryptographic schemes whose security requires both the integer factorization assumption and the discrete logarithm assumption, or related assumptions (see for example: Niko Baric and Birgit Pfitzmann, "Collision-free accumulators and fail-stop signature schemes without trees", In W. Fumy, editor, *Advances in Cryptology—EUROCRYPT'97*, volume 1233 of *Lecture Notes in Computer Science*, pages 480-494, Springer-Verlag, 1997. Dan Boneh, "The decision Diffie-Hellman problem", In J. Buhler, editor, *Algorithmic Number Theory (ANTS-III)*, volume 1423 of *Lecture Notes in Computer Science*, pages 48-63. Springer-Verlag, 1998. Eiichiro Fujisaki and Tatsuaki Okamoto, "Statistical zero-knowledge protocols to prove modular polynomial equations", In B. Kaliski, Jr, editor, *Advances in Cryptology—CRYPTO '97*, volume 1294 of *Lecture Notes in Computer Science*, pages 16-30. Springer-Verlag, 1997.) Substantial savings both in memory and in transmission can be achieved without security loss. The representation used in LUC offers the same savings as one-dimensional tori over $\mathbb{Z}_N$. Unfortunately, its usage is mostly restricted to exponentiation: LUC presents an analogue of RSA. However, numerous applications require full use of multiplication. Tori over $\mathbb{Z}_N$ embed a group structure and therefore suit a much wider range of applications. This can be considered as a main feature of torus-based cryptography.

As an illustration, consider the ACJT group signature scheme, Giuseppe Ateniese, Jan Camenisch, Marc Joye, and Gene Tsudik, "A practical and provably secure coalition-resistant group signature scheme", In M. Bellare, editor, *Advances in Cryptology—CRYPTO 2000*, volume 1880 of *Lecture Notes in Computer Science*, pages 255-270. Springer-Verlag, 2000. This AJCT scheme was used in the design of the protocol standardized by the Trusted Computing Group to protect privacy of the device's user (see Trusted Computing Group. TCG TPM specification 1.2. Available at http://www.trustedcomputinggroup.org/, 2003). Group signature schemes, as introduced by Chaum and van Heyst allow a group member to sign anonymously on behalf of the group (see David Chaum and Eugene van Heyst, "Group signatures", In D. W. Davies, editor, *Advances in Cryptology—EUROCRYPT'91*, volume 547 of *Lecture Notes in Computer Science*, pages 257-265. Springer-Verlag, 1991). However, the group manager is able to recover the signer's identity. The ACJT scheme makes use of arithmetic modulo N, where N=pq is a strong RSA modulus. Each group member possesses a membership certificate [A; e] satisfying $A^e = a^x a_0$ (mod N) where $\{a, a_0, N\}$ are common public parameters and x denotes the member's private key. As the group manager may know the factorization of N, the secrecy of private key x is only guaranteed modulo p and q. As remarked by Camenisch and Groth (see Jan Camenisch and Jens Groth, "Group signatures: Better efficiency and new theoretical aspects", In C. Blundo and S. Cimato, editors, *Security in Communication Networks* (SCN 2004), volume 3352 of *Lecture Notes in Computer Science*, pages 120-133. Springer-Verlag, 2004), if it is desired to disallow the group manager to frame group members, the length of modulus N should typically be doubled. Based on current understanding, a torus-based implementation offers the same security level but without requiring an increase of the length of N. For example, for an expected 80-bit security level, the size of the resulting signatures is about 11 kb (this is half than that of the original scheme in the case of a malicious group manager) and the generation of a group signature is more than three times faster.

The rest of this description is organized as follows. First, some background on algebraic tori is provided. A compact representation of one-dimensional tori from the geometric interpretation of the group law on Pell conics is detailed. Compact representations for higher-dimensional tori are also discussed. Then, tori-based representations are extended over rings. The main focus is put on the ring $\mathbb{Z}_N$ where N is an RSA modulus. The so-obtained representations are compared with Lucas-based representations and it is explained why the latter are inappropriate. Finally, applications of the compression are addressed. A torus-based implementation of the basic ElGamal encryption scheme is presented, as is a detailed implementation of the ACJT group signature scheme using a torus-based representation and the performance of the resulting scheme is discussed.

Torus-Based Cryptography

Let $\mathbb{F}_q$ denote the finite field with $q=p^r$ elements. The order of the multiplicative group $\mathbb{F}_p^{x} r = \mathbb{F}_p r \setminus \{0\}$ is $p^r - 1$. Note that $p^r - 1 = \prod_{d|r} \Phi_d(p)$ where $\Phi_d(x)$ represents the r-th cyclotomic polynomial. We let $G_{p,r} \subseteq \mathbb{F}_p^{x} r$ denote the cyclic subgroup of order $\Phi_r(p)$.

In the previously mentioned article, Rubin and Silverberg identify $G_{p,r}$ with the $\mathbb{F}_p$-points of an algebraic torus $T_r(\mathbb{F}_p)$. Namely, they consider $T_r(\mathbb{F}_p) = \{\alpha \in \mathbb{F}_p^{x} r | N \mathbb{F}_{p^r/F}(\alpha) = 1$ whenever $\mathbb{F}_p \subseteq F \subsetneq \mathbb{F}_p r\}$, that is, the elements of $\mathbb{F}_p^{x} r$ whose norm is one down to every intermediate subfield F. The key observation is that $T(\mathbb{F}_p)$ forms a group whose elements can be represented with only $\phi(r)$ elements of $\mathbb{F}_p$, where $\phi$ denotes Euler's totient function. The compression factor is thus of $r/\phi(r)$ over the field representation.

Parameterization of $T(\mathbb{F}_p)$

Now follows an explicit compact representation of $T_r(\mathbb{F}_p)$ for the case r=2. This gives $|\mathbb{F}_p^{x} 2| = p^2 - 1$, $\Phi_2(p+1)$, and $G_{p,2} = \{\alpha \in \mathbb{F}_p^{x} 2 | \alpha^{\Phi_2(p)} = 1\}$. It is assumed that p is odd. $\mathbb{F}_p 2 = \mathbb{F}_p(\sqrt{\Delta})$ for some non-square $\Delta \in \mathbb{F}_p^{x}$. Also $G_{p,2} = \{x + y\sqrt{\Delta} | x, y \in \mathbb{F}_p$ and $(x + y\sqrt{\Delta})^{p+1} = 1\}$. Since $(x + y\sqrt{\Delta})^p = x - y\sqrt{\Delta}$, it follows that $(x + y\sqrt{\Delta})^{p+1} = (x - y\sqrt{\Delta})(x + y\sqrt{\Delta}) = x^2 - \Delta y^2$.

So, the group $G_{p,2}$ can be seen as the set of $\mathbb{F}_F$ points on the genus 0 curve C over $\mathbb{F}_p$ given by the Pell equation $$C_{/\mathbb{F}_p}: x^2 - \Delta y^2 = 1 \qquad (1)$$

Further, $G_{p,2} \cong T(\mathbb{F}_p) \cong C(\mathbb{F}_p)$; see lemma 7 in Rubin and Silverberg (and also theorem 4.5 of Alfred J. Menezes, Elliptic Curve Public Key Cryptosystems; Kluwer Academic Publishers, 1993). If $\oplus$ denotes the group law on $C(\mathbb{F}_p)$, given two points $(x_1, y_1), (x_2, y_2) \in C(\mathbb{F}_p)$, then $$(x_1, y_1) \oplus (x_2, y_2) = (x_1 x_2 + \Delta y_1 y_2, x_1 y_2 + x_2 y_1).$$

The neutral element is $\mathcal{O} = (1, 0)$ and the inverse of $(x, y)$ is $(x, -y)$.

As remarked by Isabelle Déchène in chapter 3 of *Generalized Jacobians in Cryptography* (PhD thesis, McGill University, Montreal, Canada), the geometric interpretation of the group law on $C(\mathbb{F}_p)$ gives rise to a compact representation. Let $\mathcal{P} = (x_1, y_1)$ and $Q = (x_2, y_2)$ be two points of $C(\mathbb{F}_p)$. The group law on $C(\mathbb{F}_p)$ is given by the so-called 'chord-and-tangent' rule (see Boleslas Niewenglowski, Note sur les équations $x^2 a y^2 = 1$ et $x^2 - a y^2 = -1$; Bulletin de la Société Mathématique de France, 35:126-131, 1907; see also §1 of Franz Lemmermeyer, Higher descent on Pell conics (III), Preprint, 2003 for a detailed account). $\ell_{\mathcal{P},Q}$ denotes the line passing through $\mathcal{P}$ and Q; $\ell_{\mathcal{P},Q}$ represents the tangent line at $\mathcal{P}$ if $\mathcal{P} = Q$. The parallel line, say $\ell_{\mathcal{P},Q}'$, to $\ell_{\mathcal{P},Q}$ that passes through $\mathcal{O} = (1, 0)$ intersects (counting multiplicity) the Pell conic $C(\mathbb{F}_p)$ at precisely one other point $(x_3, y_3)$, which is defined as $\mathcal{P} \oplus Q$. If m denotes the slope of $\ell_{\mathcal{P},Q}$ then the equation of $\ell_{\mathcal{P},Q}'$ is given by $y = m(x-1)$. Therefore, $(x_3, y_3)$ satisfies $x_3^2 - \Delta y_3^2 = 1$ and $y_3 = m(x_3 - 1)$. Thus, $$x_3^2 - \Delta m^2(x_3-1)^2 = 1 \Leftrightarrow (x_3-1)(x_3(1-\Delta m^2) + \Delta m^2 + 1) = 0.$$

As $y_3 = m(x_3 - 1)$, $$(x_3, y_3) = \left(\frac{\Delta m^2 + 1}{\Delta m^2 - 1}, \frac{2m}{\Delta m^2 - 1}\right) = \left(\frac{(\Delta m)^2 + \Delta}{(\Delta m)^2 - \Delta}, \frac{2(\Delta m)}{(\Delta m)^2 - \Delta}\right)$$

Let now $\mathcal{P} = (x, y)$ be a point in $C(\mathbb{F}_p) \setminus \{\mathcal{O}\}$. Since $\mathcal{P} = \mathcal{P} + \mathcal{O}$, there is a map $$\psi: \mathbb{F}_p \to C(\mathbb{F}_p) \setminus \{\mathcal{O}\}, \overline{m} \mapsto \mathcal{P} = \left(\frac{\overline{m}^2 + \Delta}{\overline{m}^2 - \Delta}, \frac{2\overline{m}}{\overline{m}^2 - \Delta}\right) \quad (2)$$

where $\overline{m} = \Delta m$ and m is the slope of the line $\ell_{\mathcal{P},\mathcal{Q}}$ passing through $\mathcal{P}$ and $\mathcal{O}$. (A slightly faster arithmetic is obtained by considering $\overline{m}$ rather than m; this corresponds to the map in §5.2 of Rubin and Silverberg.) Note that $\overline{m}^2 - \Delta \neq 0$ for all $\overline{m} \in \mathbb{F}_p$, since $\Delta$ is a non-square in $\mathbb{F}_p$.

Proposition 1. The set of solutions satisfying Eq. (1) is given by $$\{\psi(\overline{m}) | \overline{m} \in \mathbb{F}_p\} \cup \{\mathcal{O}\}$$

Proof. It is easy to see that $\psi$ is injective. Indeed, assuming $\psi(\overline{m}_1) = \psi(\overline{m}_2)$ gets $$(\overline{m}_1^2 + \Delta)(\overline{m}_2^2 - \Delta) = (\overline{m}_2^2 + \Delta)(\overline{m}_1^2 - \Delta)$$

$$2\overline{m}_1(\overline{m}_2^2 - \Delta) = 2\overline{m}_2(\overline{m}_1^2 - \Delta)$$

$$\overline{m}_1^2 = \overline{m}_2^2$$

$$2\overline{m}_1(\overline{m}_2^2 - \Delta) = 2\overline{m}_2(\overline{m}_1^2 - \Delta)$$

$$\overline{m}_1 = \overline{m}_2$$

This concludes the proof by noting that there are (p+1) solutions to Eq. (1). □

The inverse map is given by $$\psi^{-1}: C(\mathbb{F}_p) \setminus \{\mathcal{O}\} \to \mathbb{F}_p, (x, y) \mapsto \overline{m} = \frac{\Delta y}{x - 1} \quad (3)$$

By augmenting $\mathbb{F}_p$ with $\infty$, maps $\psi$ and $\psi^{-1}$ yield an isomorphism $C(\mathbb{F}_p) \tilde{\to} \mathbb{F}_p \cup \{\infty\}$ by defining $\psi(\infty) = \mathcal{O}$ and $\psi^{-1}(\mathcal{O}) = \infty$.

The latter representation enables the following definition $$\mathcal{T}_2(\mathbb{F}_p) = \{\overline{m} | \overline{m} = \psi^{-1}(x,y) \text{ with } (x,y) \in C(\mathbb{F}_p)\} \quad (4)$$

The neutral element in $\mathcal{T}_2(\mathbb{F}_p)$ is $\infty$. The inverse of $\overline{m}$ is $-\overline{m}$. Let $\overline{m}_1, \overline{m}_2 \in \mathcal{T}_2(\mathbb{F}_p) \setminus \{\infty\}$, $\otimes$ is the group law (torus multiplication) in $\mathcal{T}_2(\mathbb{F}_p)$. If $\overline{m}_1 = -\overline{m}_2$ then $\overline{m}_1 \otimes \overline{m}_2 = \infty$. If $\overline{m}_1 \neq -\overline{m}_2$, then $$\overline{m}_1 \otimes \overline{m}_2 = \psi^{-1}(\psi(\overline{m}_1) \oplus \psi(\overline{m}_2)) = \frac{\overline{m}_1 \overline{m}_2 + \Delta}{\overline{m}_1 + \overline{m}_2} \quad (5)$$

As a result, it is possible to do cryptography in $\mathcal{T}_2(\mathbb{F}_p)$ by doing all arithmetic directly in $\mathbb{F}_p$.

Trace-Based Compression

The trace map is defined by $$Tr: \mathbb{F}_{p^2} \to \mathbb{F}_p: \alpha \mapsto Tr(\alpha) = \alpha + \alpha^p.$$

Then $\alpha \in G_{p,2}$ and its conjugate $\alpha^p$ are the roots of polynomial $(X-\alpha)(X-\alpha^p) = X^2 - Tr(\alpha)X + 1$. Define $V_k = Tr(\alpha^k)$. Since $V_k = \alpha^k + \alpha^{-k}$, it is easily verified that $V_{i+j} = V_i V_j - V_{i-j}$. In particular, $V_{2i} = V_i^2 - 2$ and $V_{2i+1} = V_{i+1} V_i - Tr(\alpha)$. Therefore, if l is the binary length of k, $Tr(\alpha^k)$ can be evaluated quickly with only l multiplications and l squarings in $\mathbb{F}_p$ using the Montgomery ladder (see e.g. FIG. 4 of Marc Joye and Sung-Ming Yen. The Montgomery powering ladder. In B. S. Kaliski, Jr., ç. K. Koç, and C. Paar, editors, *Cryptographic Hardware and Embedded Systems—CHES* 2000, volume 2523 of *Lecture Notes in Computer Science*, pages 291-302. Springer-Verlag, 2000). As can be seen, trace-based representations are well suited for exponentiation.

It should be noted that letting $P = Tr(\alpha), V_k = V_k(P, 1)$ corresponds to the $k^{th}$ item of Lucas sequence $\{V_k(P, Q)\}$ with parameter Q=1. Moreover, since $\alpha \in G_{p,2}$, it follows that $\alpha \neq \alpha^p$ and $\Delta := Tr(\alpha)^2 - 4 = P^2 - 4$ is a non-square. Let $\{U_k(P,1)\}$ denote the companion Lucas sequence where $U_k \in \mathbb{F}_p$ satisfies $V_k + U_k \sqrt{\Delta} = 2\alpha^k$. Noting that $\sqrt{\Delta} = \alpha - \alpha^{-1}$ gives $U_k = (\alpha^k - \alpha^{-k})/(\alpha - \alpha^{-1})$. In addition, $V_k^2 - \Delta U_k^2 = (V_k + U_k \sqrt{\Delta})(V_k - U_k \sqrt{\Delta}) = (2\alpha^k)(2\alpha^{-k}) = 4$. Consequently, an element $\alpha = x + y\sqrt{\Delta} \in G_{p,2}$ can be equivalently written as $$\alpha = \frac{V_1}{2} + \frac{U_1}{2} \sqrt{\Delta} \text{ and } \alpha^k = \frac{V_k}{2} + \frac{U_k}{2} \sqrt{\Delta}$$

such that $$\left(\frac{V_k}{2}\right)^2 - \Delta \left(\frac{U_k}{2}\right)^2 = 1.$$

In other words, $$C(\mathbb{F}_p) = \left\{ \left(\frac{V_k}{2}, \frac{U_k}{2}\right) \middle| 0 \leq k \leq p \right\}.$$

Trace-based representations over $\mathbb{F}_p$ can be 'enhanced' to allow the multiplication of two compressed elements. For $y \in \mathbb{F}_p$, the parity bit of y can be defined as par(y)=y mod 2. As prime p is odd, it is obvious that par(p-y)=1-par(y) if $y \in \mathbb{F}_p \setminus \{0\}$. Hence, a point $\mathcal{P} = (x,y) \in C(\mathbb{F}_p)$ is uniquely identified by the pair $(x, \beta)$ where $\beta$=par(y). This is called the enhanced trace-based representation. Hence, given $(x_1, \beta_1)$ and $(x_2, \beta_2)$ (corresponding to $\mathcal{P}_1$ and $\mathcal{P}_2 \in C(\mathbb{F}_p)$), the compressed value $(x_3, \beta_3)$ (corresponding to $\mathcal{P}_3 = \mathcal{P}_1 \oplus \mathcal{P}_2$) can be obtained as follows:

evaluate square roots $\sqrt{(x_1^2-1)/\Delta}$ and $\sqrt{(x_2^2-1)/\Delta}$ over $\mathbb{F}_p$, recover $\mathcal{P}_1 = (x_1, y_1)$ and $\mathcal{P}_2 = (x_2, y_2)$ from $\beta_1$ and $\beta_2$, compute $(x_3, y_3) = (x_1, y_1) \oplus (x_2, y_2)$, and output $(x_3, \beta_3)$ with $\beta_3 = y_3$ mod 2.

Compared to torus-based representation, this is however at the expense of the computation of two square roots and of further memory requirements.

Parameterization of Higher Dimensional Tori

The next cases for which the ratio $r/\phi(r)$ is large (and thus leading to optimal compression factors) are r=6 and r=30. An explicit compact representation of $\mathcal{T}_6(\mathbb{F}_p)$ is detailed Section 5.1 of the previously mentioned *Torus-Based Cryptography* by Karl Rubin and Alice Silverberg. For the case r=30, see section 5 of Marten van Dijk, Robert Granger, Dan Page, Karl Rubin, Alice Silverberg, Martijn Stam, and David Woodruff, *Practical cryptography in high dimensional tori*. In R. Cramer, editor, *Advances in Cryptology—EUROCRYPT*

2005, volume 3492 of *Lecture Notes in Computer Science*, pages 234-250. Springer-Verlag, 2005.

Compact Representations over the Ring $\mathbb{Z}_N$

Let N=pq be the product of two large primes and $\mathbb{Z}_N$ denote the ring of integers modulo N. The isomorphism $\mathbb{Z}_N \cong \mathbb{F}_p \times \mathbb{F}_q$ induces an isomorphism between $\mathcal{T}_r(\mathbb{Z}_N)$ and $\mathcal{T}_r(\mathbb{F}_p) \times \mathcal{T}_r(\mathbb{F}_q)$.

Current knowledge in cryptanalytic techniques implies that the hardness of factoring an RSA modulus N or computing discrete logarithms in a finite field of the size of N is broadly the same. Assuming that p and q are of equal size, the discrete logarithm problem in $\mathcal{T}_r(\mathbb{F}_p)$ and in $\mathcal{T}_r(\mathbb{F}_q)$ will thus not be easier than factoring N provided that r≥2. For efficiency reasons, a smaller value of r yields better performance. Henceforth, the description will focus on $\mathcal{T}_r(\mathbb{Z}_N)$ with r=2.

Tori $\mathcal{T}_2(\mathbb{Z}_N)$ and $\tilde{\mathcal{T}}_2(\mathbb{Z}_N)$

Consider the Pell equation over $\mathbb{Z}_N$, $$C_{/\mathbb{Z}_N}: x^2 - \Delta y^2 = 1$$

where $\Delta \in \mathbb{Z}_N^x$ is a non-square modulo p and modulo q. By Chinese remaindering, the set of points $(x,y) \in \mathbb{Z}_N \times \mathbb{Z}_N$ satisfying this equation form a group, $C(\mathbb{Z}_N) = C(\mathbb{F}_p) \times C(\mathbb{F}_q)$, under the 'chord-and-tangent' law (see "Parameterization of $\mathcal{T}_2(\mathbb{F}_p)$"). The neutral element is $\mathcal{O}(1,0)$. For each point $\mathcal{P} \in C(\mathbb{Z}_N)$, there exists a unique pair of points $\mathcal{P}_p \in C(\mathbb{F}_p)$ and $\mathcal{P}_q \in C(\mathbb{F}_q)$ such that $\mathcal{P} \bmod p = \mathcal{P}_p$ and $\mathcal{P} \bmod q = \mathcal{P}_q$. This equivalence is denoted by $\mathcal{P} = [\mathcal{P}_p, \mathcal{P}_q]$.

It is now possible to extend the previous compression map (cf. Eq. (3)) to $\mathbb{Z}_N$. The only complication is that they are some points of the form $[\mathcal{P}_p, \mathcal{O}_7]$ or $[\mathcal{O}_p, \mathcal{P}_q]$. To deal more easily with these points, a projective representation is considered for the compressed result. $\bar{m}$ is written as a pair (M:Z) and $\bar{m}=(M:Z)$ is said to be equivalent to $\bar{m}'=(M':Z')$ if there exists some $t \in \mathbb{Z}_N^x$ such that M'=tM and Z'=tZ. Definition:

$$\psi^{-1}: C(\mathbb{Z}_N) \to \mathbb{P}^1(\mathbb{Z}_N), (x,y) \mapsto \bar{m}=(\Delta y:x-1) \quad (6)$$

This in turn leads to the definition of $\mathcal{T}_2(\mathbb{Z}_N)$, $$\mathcal{T}_2(\mathbb{Z}_N) = \{\bar{m} | \bar{m} = \psi^{-1}(x,y) \text{ with } (x,y) \in C(\mathbb{Z}_N)\} \quad (7)$$

Group law. The group law (torus multiplication) on $\mathcal{T}_2(\mathbb{Z}_N)$ is denoted $\otimes$. The neutral element is (t:0) for some $t \in \mathbb{Z}_N^x$. The inverse of an element $\bar{m}=(M:Z)$ is (-M:Z). From Eq. (5), given $\bar{m}_1=(M_1:Z_1)$ and $\bar{m}_2=(M_2:Z_2)$ in $\mathcal{T}_2(\mathbb{Z}_N)$, a simple calculation shows that $$(M_1:Z_1) \otimes (M_2:Z_2) = (M_1 M_2 + \Delta Z_1 Z_2 : M_1 Z_2 + M_2 Z_1) \quad (8)$$

A further advantage of the projective representation is that the group law is complete: it works for all inputs $\bar{m}_1, \bar{m}_2 \in \mathcal{T}_2(\mathbb{Z}_N)$.

Affine parameterization. The map given by Eq. (6) does not yield a compact representation for $\mathcal{T}_2(\mathbb{Z}_N)$ since each element $\bar{m}$ then requires two elements of $\mathbb{Z}_N$. A possible workaround is to ignore input points of the form $[\mathcal{P}_p, \mathcal{O}_q]$ or $[\mathcal{O}_p, \mathcal{P}_p]$ and to restrict to subset $\tilde{C}(\mathbb{Z}_N) = \{(x,y) \in C(\mathbb{Z}_N) \mid x-1 \in \mathbb{Z}_N^x\} \cup \{\mathcal{O}\}$. A point $\mathcal{P}=(x,y) \in \tilde{C}(\mathbb{Z}_N)$ corresponds to $$\bar{m} = \left(\frac{\Delta y}{x-1} : 1\right)$$

if $\mathcal{P} \neq \mathcal{O}$, and $\bar{m}=(1:0)$ otherwise. Definition $$\tilde{\mathcal{T}}_2(\mathbb{Z}_N) = \{\bar{m} | \bar{m} = \psi^{-1}(x,y) \text{ with } (x,y) \in \tilde{C}(\mathbb{Z}_N)\} \quad (9)$$

From the above observation, an element $\bar{m}$ in $\tilde{\mathcal{T}}_2(\mathbb{Z}_N)$ can be represented by an element of $\mathbb{Z}_N$ plus one bit:

$$\left(\frac{\Delta y}{x-1} : 1\right)$$

or (1:0). Yet another possibility is to represent $\bar{m}$ as an element of $\mathbb{A}^1(\mathbb{Z}_N) \cup \{\infty\}$. Namely, if $\mathcal{P}=(x,y) \in \tilde{C}(\mathbb{Z}_N)$ then $$\bar{m} = \left(\frac{\Delta y}{x-1} : 1\right)$$

if $\mathcal{P} \neq \mathcal{O}$, and $\bar{m}=\infty$ otherwise. Both cases result in a compact representation for $\tilde{\mathcal{T}}_2(\mathbb{Z}_N)$.

The group $\mathcal{T}_2(\mathbb{Z}_N)$ consists of all the elements of $\tilde{\mathcal{T}}_2(\mathbb{Z}_N)$ together with a number of elements of the form (M:Z) with gcd(Z,N)=p or q (corresponding to points $[\mathcal{P}_p, \mathcal{O}_q]$ and $[\mathcal{O}_p, \mathcal{P}_q]$ in $C(\mathbb{Z}_N)$). The 'chord-and-tangent' law on $\tilde{C}(\mathbb{Z}_N)$, whenever it is defined, coincides with the group law on $C(\mathbb{Z}_N)=C(\mathbb{F}_p) \times C(\mathbb{F}_q)$. The same holds for $\tilde{\mathcal{T}}_2(\mathbb{Z}_N)$. In practice, for cryptographic applications, N is the product of two large primes. It is therefore extremely unlikely that operation $\otimes$ is not defined on $\tilde{\mathcal{T}}_2(\mathbb{Z}_N)$.

Torus-Based vs. Trace-Based Compression

Similarly to the section "Trace-based compression", Lucas sequences can be defined over the ring $\mathbb{Z}_N$ by Chinese remaindering. Trace-based or equivalently Lucas-based compressions are well suited to exponentiation. For example, Smith and Lennon proposed an analogue to RSA using Lucas sequence $\{V_k(P,1)\}$ over $\mathbb{Z}_N$ (see Peter J. Smith and Michael J. J. Lennon. LUC: A New Public Key System. In E. G. Dougall, editor, *9th International Conference on Information Security (IFIP/Sec '93)*, volume A-37 of *IFIP Transactions*, pages 103-117, North-Holland, 1993).

When more than a mere exponentiation is required, trace-based representations are not applicable. Indeed, let $\mathcal{P}_1=(x_1, y_1)$, $\mathcal{P}_2=(x_2, y_2) \in C(\mathbb{Z}_N)$. Computing $\mathcal{P}_3 = \mathcal{P}_1 \oplus \mathcal{P}_2$ being given $\mathcal{P}_1$ and $\mathcal{P}_2$ is easy: $\mathcal{P}_3 = (x_1 x_2 + \Delta y_1 y_2, x_1 y_2 + x_2 y_1)$. However, computing $x_3 = x_1 x_2 + \Delta y_1 y_2$ being only given $x_1$ and $x_2$ is not possible.

Even an enhanced trace-based representation (cf. "Trace-based compression") does not seem helpful when working over $\mathbb{Z}_N$. Here is an example of such an enhanced compression for Blum integers N (i.e. N=pq with primes p,q≡3 (mod 4)). As before, for $y \in \mathbb{Z}_N$, par(y) is defined as y mod 2 (i.e. par(y)=y mod 2). In addition, chr(y) is defined as: chr(y)=0 if $$\left(\frac{y}{N}\right) = 1$$

and chr(y)=1 otherwise, where $$\left(\frac{y}{N}\right)$$

denotes the Jacobi symbol of y modulo N. Since p,c≡3 (mod 4), $$\left(\frac{-1}{p}\right) = \left(\frac{-1}{q}\right) = -1.$$

It is therefore easily verified that a point $\mathcal{P} = (x, y) \in C(\mathbb{Z}_N)$ is uniquely identified by the tuple $(x, \beta, X)$ where $\beta = \text{par}(y)$ and $X = \text{chr}(y)$, that is, with one element of $\mathbb{Z}_N$ and two bits. Unfortunately, decompressing $(x, \beta, X)$ into $\mathcal{P} = (x,y)$ requires the knowledge of p and q, which are, in most settings, private values. Unlike the finite field case, enhanced trace-based representation over $\mathbb{Z}_N$ allowing to multiply compressed elements is unknown. Only torus-based representation over $\mathbb{Z}_N$ is available in this case to get a compact representation.

Extensions and Generalizations

Because the problems of computing discrete logarithms and of factoring were assumed to be balanced for an RSA modulus N=pq, the focus was on the case $\mathcal{T}_2(\mathbb{Z}_N)$. But the same methodology extends to higher-dimensional tori. It also generalizes to more general moduli; for example, to RSA moduli made of three prime factors. This allows for different trade-offs between the two computational problems.

Applications

The compression technique herein reduces the parameter size (typically by a factor of two). This in turn reduces the requirements for storage and transmission. It saves a significant amount in cryptographic methods where many group elements are evaluated. The inputs of those methods are at least two elements in $\tilde{\mathcal{T}}_2(\mathbb{Z}_N)$, say $\overline{m}_1$ and $\overline{m}_2$, to result in a third element $\overline{m}_3 = \overline{m}_1 \otimes \overline{m}_2$ satisfying $$\overline{m}_3 = \frac{\overline{m}_1 \overline{m}_2 + \Delta}{\overline{m}_1 + \overline{m}_2}$$

on a torus modulo N parameterized by $\Delta$; the computations being performed on a processor 10 (in FIG. 1) or a crypto-processor. FIG. 1 illustrates how the processor 10 receives input and outputs a result.

A first example is a torus-based implementation of the basic ElGamal encryption scheme (see Taher ElGamal. A public key cryptosystem and a signature scheme based on discrete logarithms. *IEEE Transactions on Information Theory*, 31(4):469-472, 1985). Let N=pq denote a RSA modulus. The public key consists of an element $g \in \tilde{\mathcal{T}}_2(\mathbb{Z}_N)$ and of $y = g^x \in \tilde{\mathcal{T}}_2(\mathbb{Z}_N)$ for some integer x. The corresponding secret key is x. To encrypt a message m viewed as an element in $\tilde{\mathcal{T}}_2(\mathbb{Z}_N)$, the ciphertext $(c_1, c_2)$ is computed in $\tilde{\mathcal{T}}_2(\mathbb{Z}_N)$, where $c_1 = g^r$ and $c_2 = m \otimes y^r$. Then, using secret key x, plain message m can be recovered from $(c_1, c_2)$ as $c_2 \otimes (c_1)^{-r}$.

A second example is the ACJT group signature scheme. To simplify the presentation, the various security lengths ($\lambda_1, \lambda_2, y_1, y_2$) and corresponding ranges ($\Lambda, \Gamma$) are omitted (for details, see "A practical and provably secure coalition-resistant group signature scheme" already mentioned herein).

Slight modifications need to be brought to the scheme. The original ACJT group signature scheme makes use of a strong RSA modulus, that is, N=pq with p=2p'+1 and q=2q'−1 for primes p', q'. Since $G_{p,2}$ (resp. $G_{q,2}$) has order p+1 (resp. q+1), a RSA modulus N=pq is chosen with p=4p'−1 and q=4q'−1 for primes p', q'. Note that doing so −1 is a non-square modulo p and modulo q (i.e., p, q ≡ 3 (mod 4), which yields faster arithmetic. The subgroup of squares in $\mathcal{T}_2(\mathbb{Z}_N)$ is denoted by $\mathbb{T}_2$. Finally, $\tilde{\mathbb{T}}_2$ is set $\tilde{\mathbb{T}}_2 = \mathbb{T}_2 \cap \tilde{\mathcal{T}}_2(\mathbb{Z}_N)$.

Being a group signature scheme, the modified scheme consists of five algorithms. The notation from "A practical and provably secure coalition-resistant group signature scheme" will be used.

Setup Select two random primes p', q'≡1 (mod 4) such that p=4p'−1 and q=4q'−1 are prime. Set the modulus N=pq. Choose random elements a, $a_0$, g, h in $\tilde{\mathbb{T}}_2$. Choose a random element $x \in \mathbb{Z}_{prq}{}^x$, and set $y = g^x \in \tilde{\mathbb{T}}_2$. The group public key is $\mathcal{Y} = (N, a, a_0, y, g, h)$. The corresponding secret key (known only to the group manager) is S=(p', q', x).

Join Each user $U_i$ interactively constructs with the group manager a membership certificate $[A_i, e_i]$ satisfying $A_i^{e_i} = \alpha^{x_i} \otimes \alpha_0$ in $\tilde{\mathbb{T}}_2$ for some prime $e_i$. Parameter $x_i$ is the private key of $U_i$ (and is unknown to the group manager).

Sign Generate a random value w and compute in $\tilde{\mathbb{T}}_2$
$T_1 = A_i \otimes y^w, T_2 = g^w, T_3 = g^{e_i} \otimes h^w$ Randomly choose values $r_1, r_2, r_3, r_4$ and compute, 1. in $\tilde{\mathbb{T}}_2$, $d_1 = T_1^{r_1} \otimes (a^{r_2} (\otimes y^{r_3})^{-1}, d_2 = T_2^{r_1} \otimes (g^{r_3})^{-1}, d_3 = g^{r_4}, d_4, d_4 = g^{r_1} \otimes h^{r_4}$
2. $c = \mathcal{H}(\mathcal{Y} \| T_1 \| T_2 \| T_3 \| d_1 \| d_2 \| d_3 \| d_4 \| m)$ where m is the message being signed;
3. in $\mathbb{Z}$, $s_1 = r_1 - c(e_i - 2^{y_q}), s_2 = r_2 - C(x_i - 2^{\lambda_1}), s_3 = r_3 - ce_i w, s_4 = r_4 - cw$ The signature on message m is $\sigma = (c, s_1, s_2, s_3, s_4, T_1, T_2, T_3)$.

Verify Compute in $\tilde{\mathbb{T}}_2$
$d'_1 = a_0{}^c \otimes T_1{}^{s_1 - c 2^{y_1}} (\otimes (z^{s_2 - c 2^{\lambda_1}} \otimes y^{s_3})^{-1}, d'_2 = T_2{}^{s_1 - c 2^{y_1}} \otimes (g^{s_3})^{-1}$,
$d'_3 = T_2{}^c \otimes g^{s_4}, d'_4 = T_3{}^c (\otimes g^{s_1 - c 2^{y_1}} \otimes h^{s_4})$ Accept the signature if and only if $c' = \mathcal{H}(\mathcal{Y} \| T_1 \| T_2 \| T_3 \| d'_1 \| d'_2 \| d'_3 \| d'_4 \| m)$ is equal to c (and if the signature components belong to appropriate ranges).

Open Check the signature's validity. The group manager then recovers $A_i = T_1 \otimes (T_2{}^x)^{-1}$ in $\tilde{\mathbb{T}}_2$.

The performance of the modified scheme will now be discussed and compared with the original ACJT scheme.

Let $l_N$ denote the binary length of modulus N. The system secret key S requires $2l_N$ bits. As shown in "Tori $\tilde{\mathbb{T}}_2(\mathbb{Z}_N)$ and $\tilde{\mathbb{T}}_2(\mathbb{Z}_N)$", an element in $\tilde{\mathbb{T}}_2 \backslash \{\infty\}$ can be coded with $l_N$ bits using an affine parameterization. Hence, the common public key $\mathcal{Y}$ consisting of 6 elements of $\tilde{\mathbb{T}}_2$ requires $6 l_N$ bits. The size of exponent $e_i$ in membership certificate $[A_i, e_i]$ and of corresponding private key $x_i$ are about the size of $N^2$; therefore, a membership certificate requires roughly $3 l_N$ bits and the user's private key roughly $2 l_N$ bits. Since the size of $s_j (1 \le j \le 4)$ is about the size of $N^2$, a signature $\sigma = (c, s_1, s_2, s_3, s_4, T_1, T_2, T_3)$ requires approximatively $11 l_N$ bits. Typically, for a 80-bit security level (i.e., 2048-bit modulus for the ACJT scheme and 1024-bit modulus for its torus-based implementation), which gives

TABLE 1

Performance comparison: Typical lengths.

| | ACJT scheme | Torus-based scheme |
|---|---|---|
| Common public key | 12 kb | 6 kb |
| System secret key | 4 kb | 2 kb |
| Membership certificate | 6 kb | 3 kb |
| User's private key | 4 kb | 2 kb |
| Signature (approx.) | 22 kb | 11 kb |

The torus-based signatures are not only shorter, they are also, as will be seen, faster to generate. The cost of additions and hash computations will be neglected. For the sake of comparison, it is assumed that exponentiations are done with the basic square-and-multiply algorithm and that multi-exponentiations are evaluated with the simultaneous binary exponentiation algorithm (see e.g. Algorithm 14.88 of *Handbook of Applied Cryptography*]). A k-exponentiation with exponent of binary length l then amounts to $$(\ell-1)\left(S + \frac{2^k-1}{2^k}M\right)$$

on average, where S and M respectively represent the cost of a squaring and of a multiplication in $\widetilde{\mathbb{T}}_2$. It also requires $(2^k-2)M$ for the precomputation. Since $T_1$, $T_2$ involve exponents of size about $l_N$ bits and $T_3$, $d_1$, $d_2$, $d_3$, $d_4$ involve exponents of size about $2l_N$ bits, the generation of a signature takes about $$\ell_N\left(S+\frac{1}{2}M\right) + \ell_N\left(S+\frac{1}{2}M\right) + \qquad (10)$$
$$2\ell_N\left(S+\frac{3}{4}M\right) + 2\ell_N\left(S+\frac{7}{8}M\right) + 2\ell_N\left(S+\frac{3}{4}M\right) +$$
$$2\ell_N\left(S+\frac{1}{2}M\right) + 2\ell_N\left(S+\frac{3}{4}M\right) = 12\ell_N S + 8.25\ell_N M$$

neglecting the precomputation.

In the scheme of the present application, p, q≡3 (mod 4). It is thus possible to take Δ=−1. In this case, using projective coordinates, the multiplication of two elements $\overline{m}_1 = (M_1:Z_1)$ and $\overline{m}_2 = (M_2:Z_2)$ in $\widetilde{\mathbb{T}}_2$, $\overline{m}_3 = \overline{m}_1 \otimes \overline{m}_2$, simplifies to $\overline{m}_3 = (M_3:Z_3)$ with $M_3 = M_1 M_2 + Z_1 Z_2$ and $Z_3 = M_1 Z_2 + M_2 Z_1 = (M_1+Z_1)(M_2+Z_2)-M_3$. Let s and m denote the cost of a square and a multiplication in $\mathbb{Z}_N$. The multiplication of two elements of $\widetilde{\mathbb{T}}_2$ thus requires 3m. Note that for a mixed multiplication (i.e., when one of the two operands has its Z-coordinate equal to 1), the cost reduces to 2m. Squaring $\overline{m}_1 = (M_1:Z_1)$ can be evaluated as $\overline{m}_3 = (M_3:Z_3)$ with $Z_3 = 2M_1 Z_1$ and $M_3 = (M_1+Z_1)^2 - Z_3$ and requires thus 1s+1m. If the precomputed values in the k-exponentiation are expressed in affine way (this can be done with a single inversion and a few multiplications in $\mathbb{Z}_N$ using the so-called Montgomery's trick), then M=2m and S=1s+1 m. Therefore, neglecting the cost of this inversion in $\mathbb{Z}_N$ and assuming s=0.8m, the cost of a torus-based ACJT group signature is about $(12\cdot 1.8+8.25\cdot 2) l_N m = 38.11 l_N m$.

Similarly, Eq. (10) gives that the cost of a regular ACJT group signature is about $(12\cdot 0.8+8.25)l_N m = 17.85 l_N m$, assuming again s=0.8m. But since the length of $l_N$ is half as long in $\widetilde{\mathbb{T}}_2$, the expected speed-up factor amounts to $$\frac{17.85 \ell_N \cdot (\ell_N)^2}{38.1 (\ell_N/2) \cdot (\ell_N/2)^2} \approx 3.75$$

In practice, the expected speed-up factor is even more spectacular as the above value assumes that the same exponentiation algorithms are being used; however, for the same amount of memory, the torus-based implementation can be sped up using more pre-computed values and higher-order methods. Note also that the above analysis neglects the cost of inversion in $\mathbb{Z}_N^x$ (in the evaluation of $d_1$ and $d_2$) for the regular ACJT signatures.

It will thus be appreciated that the present invention can offer a cryptographic method that is more efficient than the prior art solutions.

Each feature disclosed in the description and (where appropriate) the claims and drawings may be provided independently or in any appropriate combination. Reference numerals appearing in the claims are by way of illustration only and shall have no limiting effect on the scope of the claims.

The invention claimed is:

1. A cryptographic method for obtaining an intermediate result for use in enciphering, authenticating or signing data, the method operating on a torus over $\mathbb{Z}_N$, wherein N is a product of at least two prime factors and the torus has parameter D in $\mathbb{Z}_N$, the method comprising the steps of:
    performing, by a processor, at least one multiplication of two elements $m_1$ and $m_2$ over the torus, and
    outputting the result of the torus multiplication,
    the result of the torus multiplication being equal to a division over $\mathbb{Z}_N$, where
        the dividend is the sum of D with the product of $m_1$ and $m_2$,
        the divisor is the sum of $m_1$ and $m_2$,
    where at least one of $m_1$ or $m_2$ is one of the following:
        a) the data to be enciphered, authenticated or signed,
        b) a cryptographic key, or
        c) an intermediate result depending of at least one of a) or b).

2. A processor for performing a cryptographic method for obtaining an intermediate result for use in enciphering, authenticating or signing data, the cryptographic method operating on a torus over $\mathbb{Z}_N$, wherein N is a product of at least two prime factors and the torus has parameter D in $\mathbb{Z}_N$, the processor being configured to:
    perform at least one multiplication of two elements $m_1$ and $m_2$ over the torus, and
    output the result of the torus multiplication,
    the result of the torus multiplication being equal to a division over $\mathbb{Z}_N$, where
        the dividend is the sum of D with the product of $m_1$ and $m_2$,
        the divisor is the sum of $m_1$ and $m_2$,
    where at least one of $m_1$ or $m_2$ is one of the following:
        a) the data to be enciphered, authenticated or signed,
        b) a cryptographic key, or
        c) an intermediate result depending of at least one of a) or b).

* * * * *